(12) United States Patent
Portisch

(10) Patent No.: US 9,276,495 B2
(45) Date of Patent: Mar. 1, 2016

(54) SWITCHING CONVERTER AND METHOD FOR CONTROLLING THE SWITCHING CONVERTER

(75) Inventor: Daniel Portisch, Mistelbach (AT)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/131,362

(22) PCT Filed: May 14, 2012

(86) PCT No.: PCT/EP2012/058868
§ 371 (c)(1),
(2), (4) Date: Jan. 7, 2014

(87) PCT Pub. No.: WO2013/004421
PCT Pub. Date: Jan. 10, 2013

(65) Prior Publication Data
US 2014/0140116 A1 May 22, 2014

(30) Foreign Application Priority Data
Jul. 7, 2011 (EP) .................................... 11172970

(51) Int. Cl.
*H02M 7/217* (2006.01)
*H02M 1/44* (2007.01)
(Continued)

(52) U.S. Cl.
CPC ............... *H02M 7/217* (2013.01); *H02M 1/44* (2013.01); *H02M 3/156* (2013.01); *H02M 3/33507* (2013.01); *Y02B 70/1425* (2013.01); *Y02B 70/1433* (2013.01)

(58) Field of Classification Search
CPC .. H02M 3/156; H02M 3/33507; H02M 7/217
USPC .......... 363/21.12, 21.13, 21.14, 21.15, 21.16, 363/21.17, 21.18
See application file for complete search history.

(56) References Cited

U.S. PATENT DOCUMENTS

| 2009/0231894 A1* | 9/2009 | Moon | ............... H02M 3/33507 363/89 |
| 2009/0323374 A1* | 12/2009 | Park | ........................ H02M 1/36 363/16 |

(Continued)

FOREIGN PATENT DOCUMENTS

| CN | 101645655 | 2/2010 |
| CN | 101931332 | 12/2010 |
| CN | 201774456 | 3/2011 |
| CN | 102082521 | 6/2011 |
| EP | 2264881 | 12/2010 |

OTHER PUBLICATIONS

Zeng Hulong et al., "An Adaptive Blanking Time Control Scheme for Audible Noise Free Quasi Resonant Flyback Converter", Energy Conversion Congress and Exposition (ECCE), 2010 IEEE, IEEE, Piscataway, NJ; pp. 1104-1109; ISBN: 978-1-4244-5286-6; XP031787071; 2010; US; Sep. 12, 2010.

(Continued)

*Primary Examiner* — Jue Zhang
*Assistant Examiner* — Lakaisha Jackson
(74) *Attorney, Agent, or Firm* — Cozen O'Connor

(57) ABSTRACT

A switching converter and method for controlling a switching converter in a quasi resonant mode of operation, wherein a sense voltage is predefined for a PWM controller to determine a switch off time of a switching element, a switch-on time of the switching element also falls in a valley of an oscillating voltage that is being applied to the switched-off switching element, and where the sense voltage is reduced in each valley occurring after a switch-off operation such that a stable operating point is thus reached under any load.

10 Claims, 5 Drawing Sheets

(51) Int. Cl.
*H02M 3/156* (2006.01)
*H02M 3/335* (2006.01)

(56) References Cited

U.S. PATENT DOCUMENTS

2010/0321959 A1   12/2010  Matsumoto
2011/0057601 A1*   3/2011  Hiltbold .................. H02P 1/42
                                                         318/729

OTHER PUBLICATIONS

Sang Hee Kang et al., "On-Line Efficiency Optimization in Flyback DC-DC Converters Over Wide Ranges of Operating Conditions"; Applied Power Electronics Conference and Exposition (APEC); 2011 Twenty-Sixth Annual IEEE; IEEE; pp. 1417-1424; ISBN 978-1-4244-8084-5; DOI: 10. 1109/APEC.2011.5744778; XP032014062; 2011; Mar. 6, 2011.

* cited by examiner

SWITCHING CONVERTER AND METHOD FOR CONTROLLING THE SWITCHING CONVERTER

REFERENCE TO RELATED APPLICATIONS

This is a U.S. national stage of application No. PCT/EP2012/058868 filed 14 May 2012. Priority is claimed on European Application No. 11172970 filed 7 Jul. 2011, the content of which is incorporated herein by reference in its entirety.

BACKGROUND OF THE INVENTION

Field of the Invention

The invention relates to a method for controlling a switching converter in a quasi-resonant mode of operation, where a sense voltage is predefined for a PWM controller for determining a switch-off time of a switching element and where a switch-on time of the switching element falls in a valley of an oscillating voltage that is being applied to the switched-off switching element. The invention also relates to a switching converter for quasi-resonant switching, where a sense voltage and a regulator output voltage are supplied to a PWM controller for determining a switch-off time and where a valley switch controller for determining a switch-on time is provided.

Switching elements (e.g., field-effect transistors), transformers or chokes contain parasitic capacitances that lead to switching losses in hard-switching converters. In a hard-switching converter, the parasitic capacitance oscillates during the dead time in discontinuous conduction mode (DCM) with a converter main winding about an input voltage or intermediate circuit voltage. The voltage at the parasitic capacitances varies with the oscillation, but has significant values throughout. When the switching element switches on in the next clock cycle, the parasitic capacitors are discharged by way of the transistor and in so doing generate a high current peak. Because this occurs when a high voltage is present at the switching element, it generates switching losses. Furthermore, the current peak is rich in harmonics, which increases the EMI.

Instead of switching using a fixed clock cycle, in quasi-resonant switching a minimum (also known as a "valley") of the drain-source voltage of the switching element is effectively registered via a detection circuit and the switching element is switched on only at this instant in time. The peak inrush current is minimized as a result, because the parasitic capacitance is charged to the minimum voltage. This type of switching is generally referred to as valley switching, zero-crossing switching or quasi-resonant switching. It leads to a reduction in the switching losses and radiated interference emission that occur with hard-switching converters. Since the resonant circuit is employed only during the switching transitions on an otherwise conventional square-wave signal converter, this form of switching is referred to as quasi-resonant.

Every minimum of the oscillating voltage that is being applied to the switched-off switching element is referred to hereinbelow as a valley. The chronologically first minimum occurring during a switching period is referred to as the first valley. The succeeding valleys are numbered according to their chronological sequence, i.e., second valley, third valley, etc.

Switching on during a valley causes a continuous resetting of the period start (pulse reset) and consequently an adjustment of the switching frequency irrespective of the load or the intermediate circuit voltage at this instant in time. This mode of operation begins at the boundary between continuous (CCM) and discontinuous conduction mode (DCM) and comes fully into effect in discontinuous conduction mode.

In the event that the switch-on operation is performed always during the same valley (e.g., always in the first valley), the switching frequency increases with decreasing load, until a maximum frequency is reached in the idle state. However, as the frequency increases the switching losses also increase, since more loss-generating switching operations take place per time unit.

In order to avoid the excessively high switching frequency during low load, the switch-on time is usually deferred to a later valley (e.g., to the second valley). A disadvantageous aspect in this eventuality is the abrupt switchover, which induces an unstable regulating state in the controller. In such a transitional region, jumps occur back and forth between two valleys with each switching cycle to provide a regulated constant output voltage. This effect is also known as "valley skipping". Such a controller oscillation is audible in most cases and has higher power dissipation losses as a consequence.

SUMMARY OF THE INVENTION

It is an object of the invention to provide an improved a method and switching converter.

This and other objects and advantages are achieved in accordance with the invention by providing a method and switching convertor in which in order to avoid valley skipping, the sense voltage is reduced in each valley occurring after a switch-off operation. Accordingly, the sense voltage remaining constant without this measure in the switched-off state of the switching element is reduced once during a switching cycle if the switching converter switches on in the first valley. If the switch-on operation occurs in the second valley, the sense voltage is reduced twice. If the switching converter switches on in the third valley, three reductions in the sense voltage are effected, etc.

With each reduction there is a drop in the voltage level starting from which the sense voltage rises with the switching element switched on. The PWM controller switches off when the sense voltage reaches the value determined via a regulator output voltage. If there is no change in the regulator output voltage, the reduced sense voltage accordingly leads to a later switch-off. This causes an increase in the power transmitted by the switching converter.

As soon as the maximum permissible switching frequency is reached due to a predefined power reduction, a valley switch controller effects a switch-on of the switching element in a later valley. At the same time, the switching frequency drops because the switch-off time of the switching element is extended by the cycle duration of the oscillating voltage present at the switched-off switching element. Owing to the measure in accordance with the invention, the lowered switching frequency does not lead to any reduction in power. Rather, the later switch-off as a result of the reduced sense voltage leads to an increase in power. The voltage regulator of the switching converter compensates for the power increase by reducing the regulator output voltage. There is therefore no jump back to an earlier valley. Valley skipping is avoided in the same way in the case of an increase in power. As soon as a predefined power increase leads to a switch-on in an earlier valley, there is a decrease in the power transmitted as a result of the inventive intervention. The voltage regulator increases the regulator output voltage until the predefined power is reached, without jumping back to the later occurring valley.

In an advantageous embodiment, an auxiliary voltage is reduced in each occurring valley and the sense voltage is formed by summation of the auxiliary voltage and a measurement voltage proportional to the current through the switching element. In this way, a simple reduction in the sense voltage is realized.

It is furthermore of advantage here if the auxiliary voltage that is reduced in each occurring valley is formed via an analog counter from an output signal of a valley detection circuit. The analog counter counts the valleys occurring during a switching cycle such that a voltage reduction occurs in each valley that occurs.

It is furthermore beneficially provided that the zero crossings of a voltage present at an auxiliary winding is detected by a zero-crossing detection means and that the auxiliary voltage reducing with each occurring valley is formed via the analog counter from the resulting zero-crossing signal.

An advantageous method furthermore provides that the analog counter is reset after each switching cycle via a switching signal that is applied at the control output of the PWM controller.

In the switching converter according to the invention, the signal present at the output of the valley detection circuit is supplied to a circuit for reducing the sense voltage.

It is advantageous in this case if the valley detection circuit is implemented as a zero-crossing detector to which a voltage present at an auxiliary winding is supplied.

A development provides that the circuit for reducing the sense voltage comprises an analog counter and a summator, that the signal at the output of the valley detection circuit is supplied to the analog counter, and that an auxiliary voltage at the output of the analog counter and a measurement voltage proportional to the current through the switching element are supplied to the summator. In this way, a simple layout comprising few components is ensured.

To provide a simple reset operation, a switching signal present at the control output of the PWM controller is supplied to the analog counter to effect a resetting of the analog counter after each switching cycle.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in an exemplary manner below with reference to the attached schematic figures, in which.

DETAILED DESCRIPTION OF THE PREFERRED EMBODIMENTS

Figure 1:
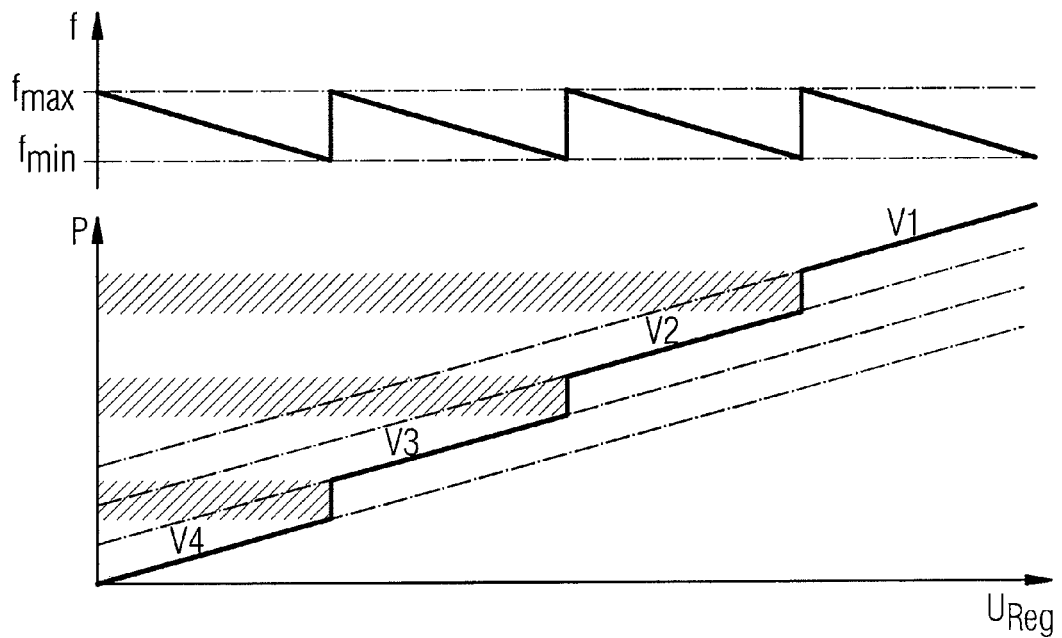
FIG. 1 shows a prior art power diagram.

The problems associated with prior art switching converters are evident from FIG. 1. Under increased load at the output of the switching converter, there is an increase in the regulator output voltage $U_{Reg}$ and consequently in the transmitted power P. At the same time, the switching frequency f decreases. When the switching frequency f reaches a predefined minimum value, the valley switch controller 3 switches from, e.g., the fourth valley V4 to, e.g., the third valley V3. As a result, there is a sudden increase in the switching frequency f and consequently in the transmitted power P of the switching converter. In order to compensate for the power increase, the voltage regulator 6 makes a downward adjustment by lowering the regulator output voltage $U_{Reg}$ again. This causes the switching frequency f to increase. When the switching frequency f reaches a predefined maximum value $f_{max}$, the valley switch controller 3 switches over again from the third valley V3 to the fourth valley V4. This causes the frequency f to drop and consequently leads to a sudden decrease in the transmitted power P. The regulator 6 thereupon specifies a higher regulator output voltage $U_{Reg}$ again. The process is repeated periodically, leading to a limit cycle oscillation with a typical oscillation frequency of 5-15 kHz. The power regions represented by hatching cannot be approached in a stable manner with a switching converter and a method according to the prior art.

Figure 2:
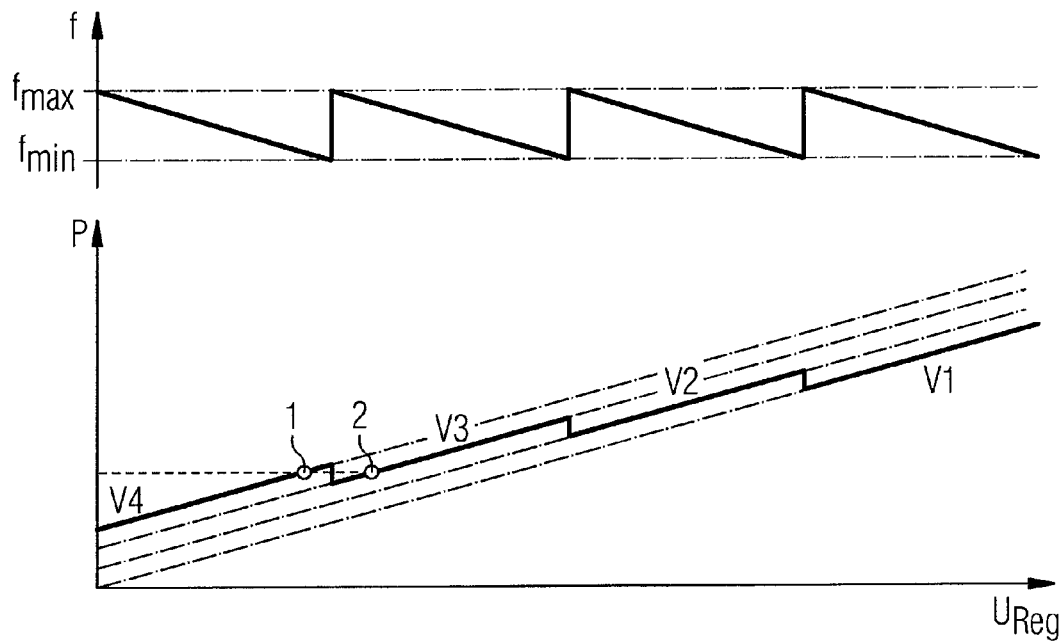
FIG. 2 shows a power diagram in accordance with the invention.

FIG. 2 shows the diagram with inventive interventions during a switchover between two valleys. If a load connected to the output increases, the regulator output voltage $U_{Reg}$ also increases and consequently so also does the transmitted power P of the switching converter. In this case, the switching frequency f decreases. As soon as the switching frequency f reaches a predefined minimum value $f_{min}$, the valley switch controller 3 switches over from, e.g., the fourth valley V4 to, e.g., the third valley V3. This causes a sudden increase in the switching frequency f. However, the power P transmitted by the switching converter decreases thanks to the inventive intervention in the current measurement. As a consequence, the regulator output voltage $U_{Reg}$ increases until the desired transmitted power P is reached.

If the load at the output is reduced, the regulator output voltage $U_{Reg}$ decreases and consequently so also does the transmitted power P. The switching frequency f increases. If the switching frequency f reaches a predefined maximum value $f_{max}$, the valley switch control means 3 switches over from e.g. the third valley V3 to, e.g., the fourth valley V4. In this case, there is a sudden drop in the frequency f. However, the transmitted power P of the switching converter increases as a result of the inventive intervention in the current measurement. As a consequence, the regulator 6 reduces the regulator output voltage $U_{Reg}$ until the desired transmitted power P is reached.

By virtue of the interventions in accordance with the invention, the voltage regulator 6 can reach stable operating points at all times both under increasing load and under decreasing load.

In the event of a load increase starting from, e.g., the fourth valley V4, the regulator output voltage $U_{Reg}$ increases until a stable operating point 1 is reached.

If the load at the output is reduced starting from, e.g., the third valley V3, the regulator output voltage $U_{Reg}$ decreases until a stable operating point 2 is reached.

Figure 3:
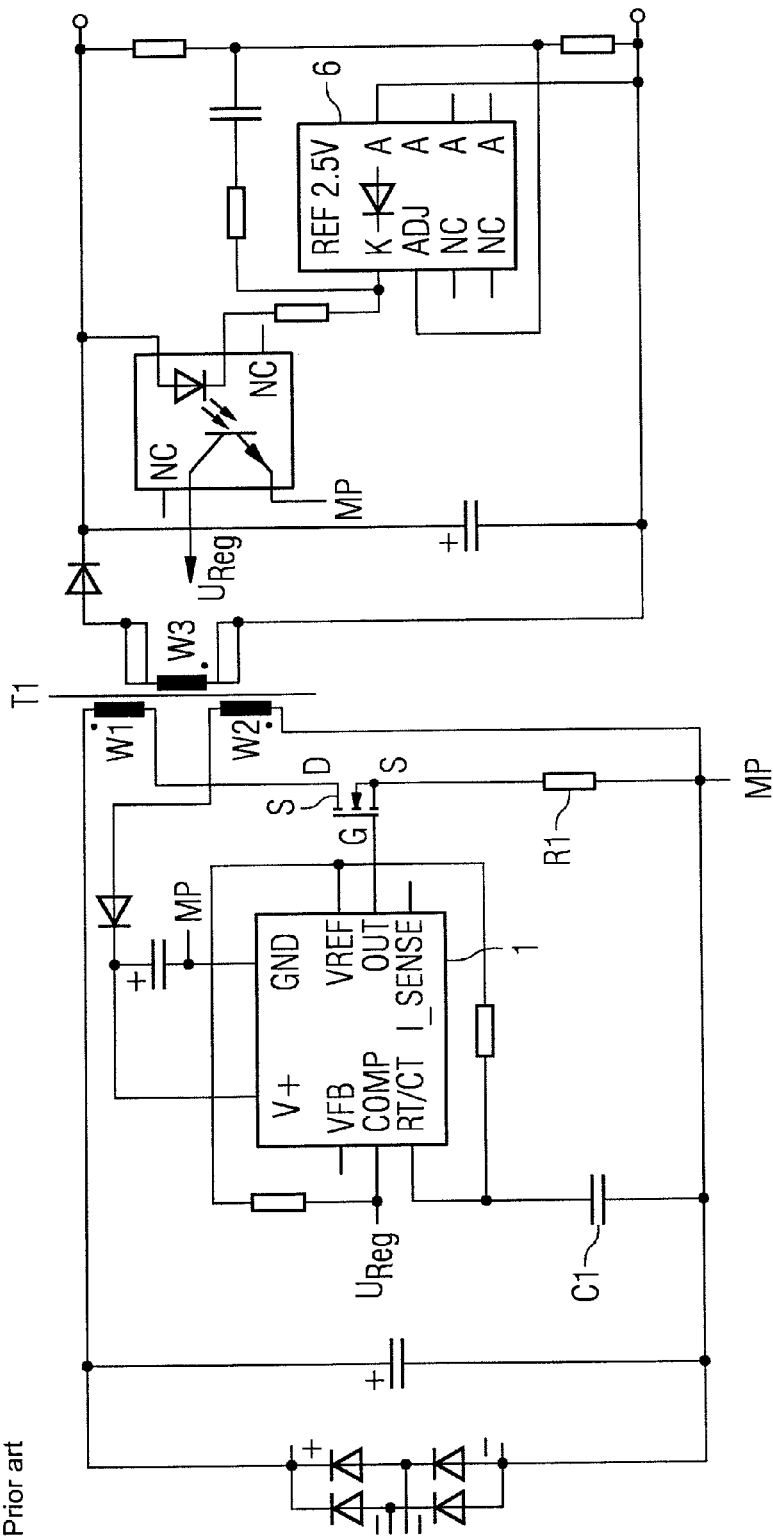
FIG. 3 shows a conventional switching converter block circuit diagram.

FIG. 3 shows a conventional switching converter. A transformer T1 comprises a main winding W1 and an auxiliary winding W2 on the primary side. Energy is delivered to the output of the switching converter via a secondary-side winding W3. The PWM controller 1 arranged on the primary side comprises a frequency generator which generates a PWM signal via a sawtooth voltage. At the same time, the switching element S is switched on at the beginning of a rising edge of the frequency generator via a control output OUT.

The regulator output voltage $U_{Reg}$ of the voltage regulator 6 is supplied to the PWM controller 1. The voltage $U_{Reg}$ or a voltage proportional thereto is compared with a sense voltage via a comparator. In this case, the sense voltage indicates the current through the switching element S. As soon as the sense voltage exceeds the comparison voltage $U_{Reg}$, the comparator flips and the switching element S is switched off via the control output OUT.

Figure 4:
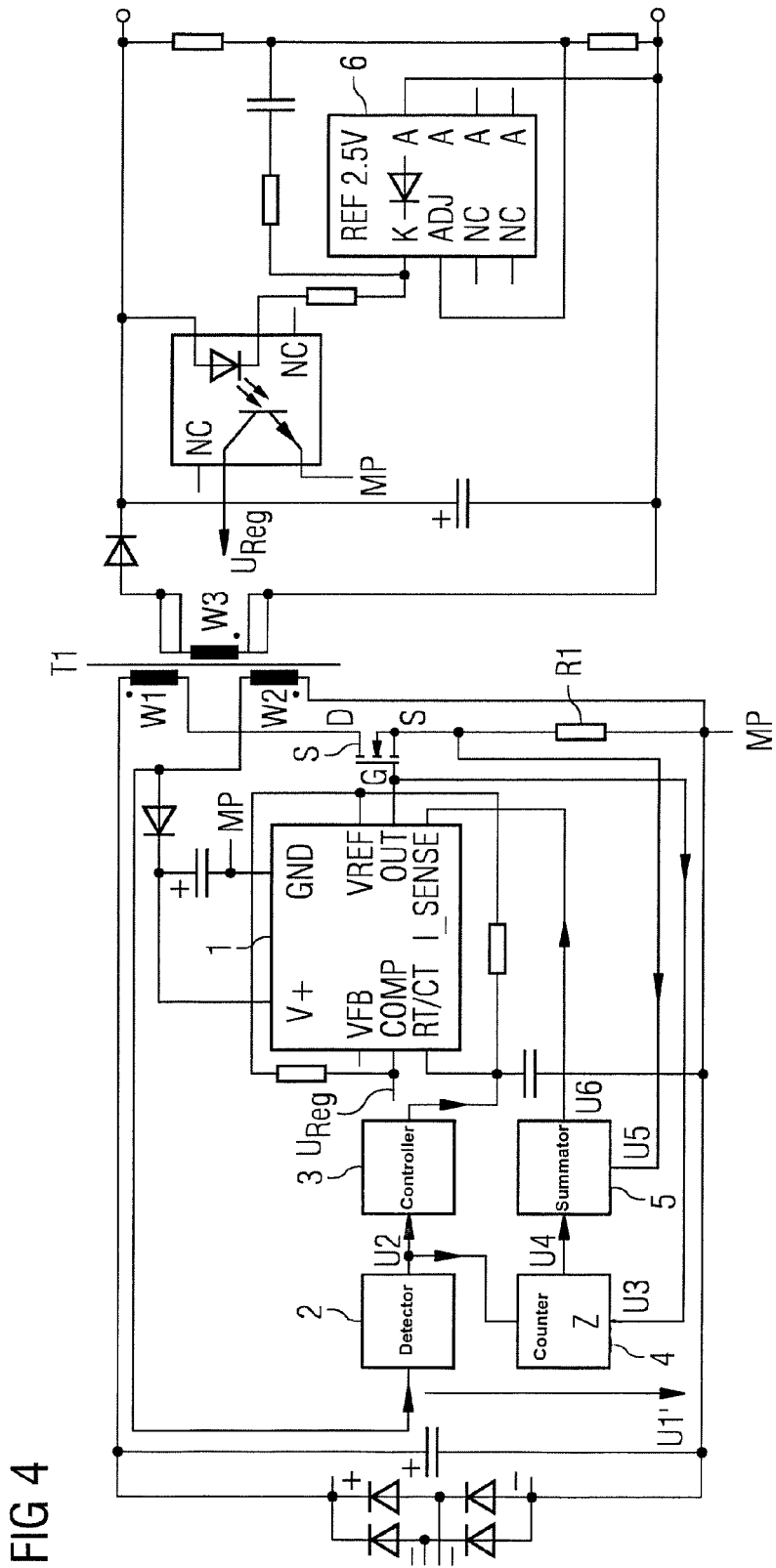
FIG. 4 shows a block circuit diagram of a switching converter in accordance with the invention.

An exemplary layout of an inventive intervention in the current measurement is illustrated in FIG. 4. The valley switch controller 3 known per se is employed in this case.

The voltage U1 present at the switched-off switching element S oscillates mainly between the output capacitances of the switching element S and the main winding W1 at a sufficiently constant oscillatory decay frequency. An image of the oscillating voltage present at the switched-off switching element S is generated via the auxiliary winding W2, the average value of said oscillating voltage corresponding to a value of zero volts. The voltage of the auxiliary winding W2 is supplied as input signal to a zero-crossing detector 2 at the output of which a zero-crossing signal U2 is present. The zero-crossing detector 2 operates with a comparator which compares the input signal with zero volts, or with a comparator which compares the input signal with a positive or negative voltage and in this way generates the zero-crossing signal U2 as leading or trailing, or with a simple transistor circuit, or with a CMOS gate which has the advantage of a very short delay, or with a digital circuit which samples the oscillatory decay frequency and calculates the zero crossings.

The zero-crossing signal U2 is supplied to the valley switch controller 3 and causes the switching element S to be always switched on in a valley of the voltage U1 present at the switched-off switching element S. At switch-on time, the winding material is magnetized.

The zero-crossing signal U2 is additionally supplied to an analog counter 4. When the switching element S is switched off, the analog counter 4 is reset. In actuality, a reset is performed via a falling edge at the control output OUT of the PWM controller 1. This leads to the winding material being demagnetized. Following a demagnetization phase, the voltage U1 present at the switching element S begins to decay. The number of valleys up to the next switch-on time of the switching element S are counted via the analog counter 4 and stored until the time of the next reset. This storage is realized as a reducing auxiliary voltage U4 that is summed with the measurement value voltage U5 of the current. This is achieved in a simple manner via a summator 5. As a result, the transmitted power P of the switching converter changes during a jump between two valleys such that the voltage regulator 6 self-stabilizes in any power range.

Figure 5:
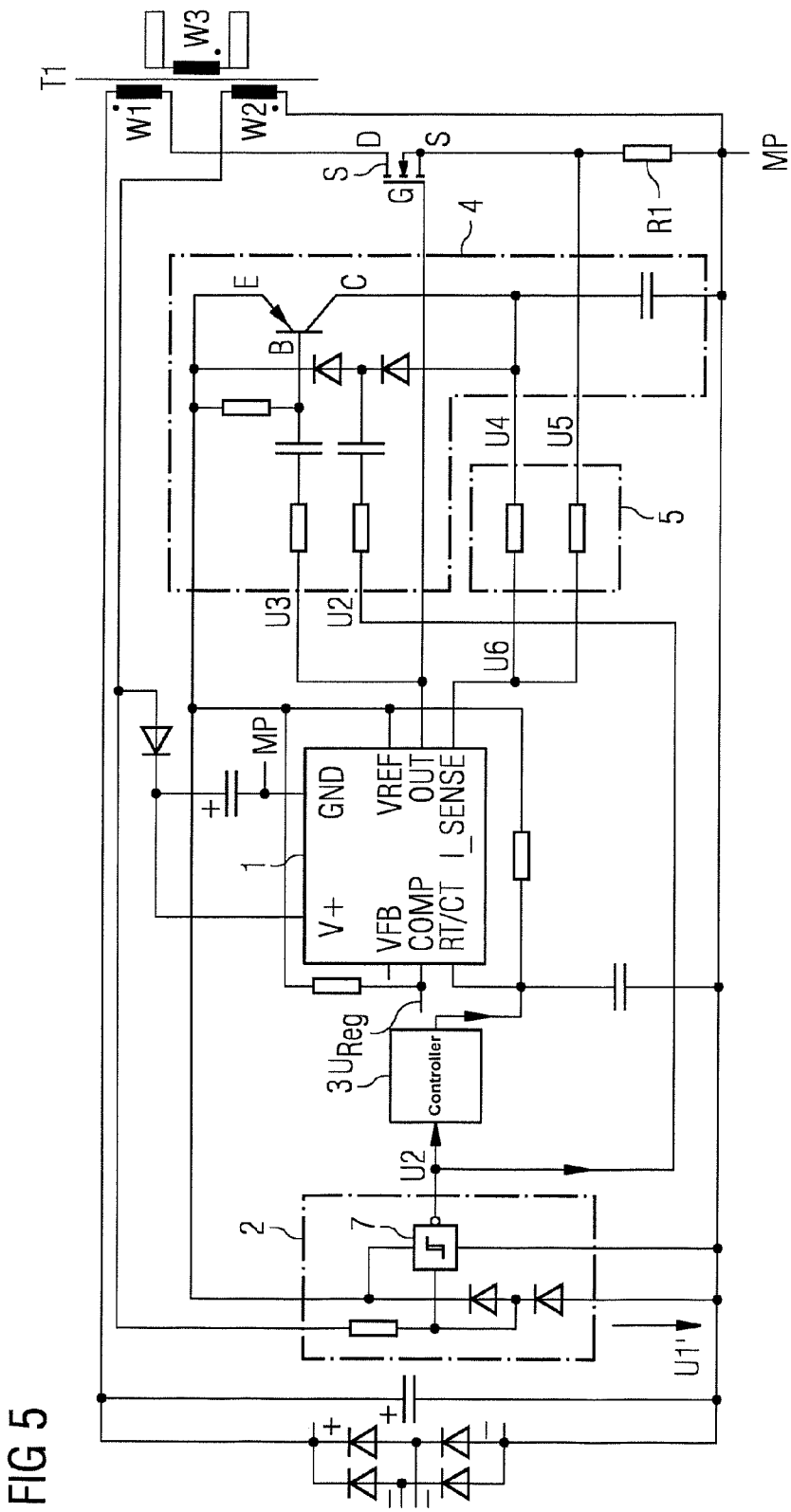
FIG. 5 shows a block circuit diagram with analog counter and summator.

A detailed implementation is shown in FIG. 5. A CMOS inverting gate 7 with Schmitt trigger input is supplied by a VREF output of the PWM controller 1. Since the voltage U1' which is present at the auxiliary winding W2 and is an image of the voltage U1 present at the switched-off switching element S can be substantially greater than the supply voltage of the gate 7, the voltage U1' is limited via a resistor and a clamping diode to the supply voltage of the gate 7. If the voltage U1' of the auxiliary winding W2 falls below the internal threshold voltage of the gate 7, the output of the buffer 7 becomes positive and a zero crossing is detected.

A signal is generated via the threshold voltage already prior to a zero crossing, as a result of which it is possible via the simple components to detect a zero crossing at an early stage even at very high oscillatory decay frequencies and consequently to switch on during a valley.

The CMOS gate 7 has the advantage of very short response times. Accordingly, a zero crossing can be detected accurately enough up to an oscillatory decay frequency of a few MHz.

With each falling edge of the switching signal U3 present at the control output OUT of the PWM controller 1, a transistor 9 is turned on for a defined time via a high-pass filter 8. As a result a capacitor 10 is charged up to the voltage value of the voltage (e.g. 5V) present at the VREF output of the PWM controller 1. A resistor 11 serves to limit the current in this case. The analog counter is thus reset.

With each falling edge of the zero-crossing signal U2, the capacitor 10 is discharged via a discharge circuit 11. The magnitude of the discharge is determined in this case by the capacitance ratio of the capacitor 10 and a capacitance of the discharge circuit 11. The discharge circuit 11 favorably includes a resistor for limiting the current. The auxiliary voltage U4 present at the capacitor 10 accordingly becomes smaller with each zero crossing of the voltage U1' present at the auxiliary winding. The valleys are counted in this way.

The counted valleys are summed in the form of the auxiliary voltage U4 via summator 4 with the measured value voltage U5, which expresses the current through the switching element S. In the simplest case, the summator 4 consists of two resistors that are tuned to one another.

The summed voltage is subsequently supplied as a modified sense voltage U6 to the PWM controller 1.

By means of the embodiment shown a cost-effective solution for preventing audible controller oscillation and a reduction in efficiency is realized with a small number of components.

Figure 6:
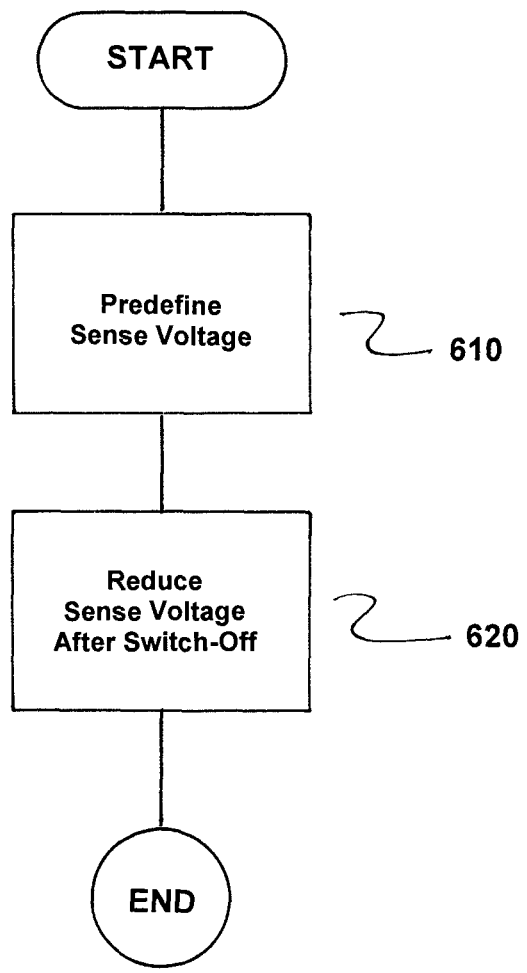
FIG. 6 in a flowchart of the method in accordance with the invention.

FIG. 6 is a flowchart of a method for controlling a switching converter in a quasi-resonant mode of operation. The method comprises predefining a sense voltage for a PWM controller to determine a switch-off time of a switching element, a switch-on time of the switching element falling in a valley of an oscillating voltage that is being applied to the switched-off switching element, as indicated in step 620.

The sense voltage in each valley occurring after a switch-off operation is then reduced, as indicated in step 630.

While there have been shown, described, and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:
1. A method for controlling a switching converter in a quasi-resonant mode of operation, comprising:

predefining a sense voltage for a PWM controller to determine a switch-off time of a switching element, a switch-on time of the switching element falling in a valley of an oscillating voltage that is being applied to the switched-off switching element, and said sense voltage indicating a current through the switched-on switching element; and reducing the sense voltage in each valley occurring after a switch-off operation such that a drop in a voltage level from which the sense voltages rises occurs with each reduction.

2. The method as claimed in claim 1, further comprising:
reducing an auxiliary voltage in each occurring valley; and
wherein the sense voltage is formed by summation of the auxiliary voltage and a measurement voltage proportional to current flowing through the switching element.

3. The method as claimed in claim 2, wherein the auxiliary voltage which is reduced in each occurring valley is formed via an analog counter from an output signal of a valley detection circuit.

4. The method as claimed in claim 3, wherein the analog counter is reset after each switching cycle via a switching signal present at a control output of the PWM controller.

5. The method as claimed in claim 3, wherein zero crossings of a voltage present at an auxiliary winding are detected by a zero-crossing detector; and
wherein the auxiliary voltage reducing in each occurring valley is formed via the analog counter from a resultant zero-crossing signal.

6. The method as claimed in claim 5, wherein the analog counter is reset after each switching cycle via a switching signal present at a control output of the PWM controller.

7. A switching converter for quasi-resonant switching, comprising:
a PWM controller, a sense voltage and a regulator output voltage being supplied to the PWM controller for determining a switch-off time, said sense voltage indicating a current through a switched-on switching element; and
a valley switch controller for determining a switch-on time;
a signal present at an output of a valley detection circuit is supplied to a circuit for reducing the sense voltage in each valley occurring after a switch-off operation such that a drop in a voltage level from which the sense voltage rises occurs with the reduction.

8. The switching converter as claimed in claim 7, wherein the valley detection circuit is implemented as a zero-crossing detector to which a voltage present at an auxiliary winding is supplied.

9. The switching converter as claimed in claim 7, wherein the circuit for reducing the sense voltage comprises an analog counter and a summator;
wherein a signal present at an output of the valley detection circuit is supplied to the analog counter; and
wherein an auxiliary voltage present at the output of the analog counter and a measurement voltage proportional to current flowing through the switching element are supplied to the summator.

10. The switching converter as claimed in claim 9, wherein a switching signal present at the control output of the PWM controller is supplied to the analog counter to effect a reset of the analog counter after each switching cycle.

* * * * *